United States Patent [19]

Cassese

[11] Patent Number: 4,871,104
[45] Date of Patent: Oct. 3, 1989

[54] AUTOMATIC VERTICAL GLASS CUTTING MACHINE

[76] Inventor: Antoine Cassese, Les Essarts No. 7, Saint-German Laxis, F-77950 Maincy, France

[21] Appl. No.: 138,868

[22] Filed: Dec. 29, 1987

[30] Foreign Application Priority Data

Dec. 30, 1986 [FR] France ................................ 86 18327

[51] Int. Cl.$^4$ ............................................ C03B 33/02
[52] U.S. Cl. ............................................ 225/96; 225/2; 225/103; 83/880; 83/886
[58] Field of Search .......................... 225/2, 96.5, 103; 83/880, 886, 879

[56] References Cited

U.S. PATENT DOCUMENTS

| 3,797,339 | 3/1974 | Pape et al. | 83/886 |
| 3,880,028 | 4/1975 | Frederick | 83/880 |
| 3,945,278 | 3/1976 | Strauss et al. | 83/886 |
| 4,175,684 | 11/1979 | Butler | 225/2 |
| 4,545,515 | 10/1985 | Kozyrski | 225/96.5 |

Primary Examiner—Donald R. Schran
Attorney, Agent, or Firm—Christel, Bean & Linihan

[57] ABSTRACT

The invention provides an automatic vertical glass cutting machine, including a cutting-wheel holder carriage which is movable vertically over a predetermined height of a vertical rap under the action of an actuator of the pneumatic kind, the cutting-wheel holder being fixed to the carriage by means of a rocker arm movable with respect to the body of the carriage which has a mechanism for locking said rocker against the carriage controlled by a fixed cam.

16 Claims, 3 Drawing Sheets

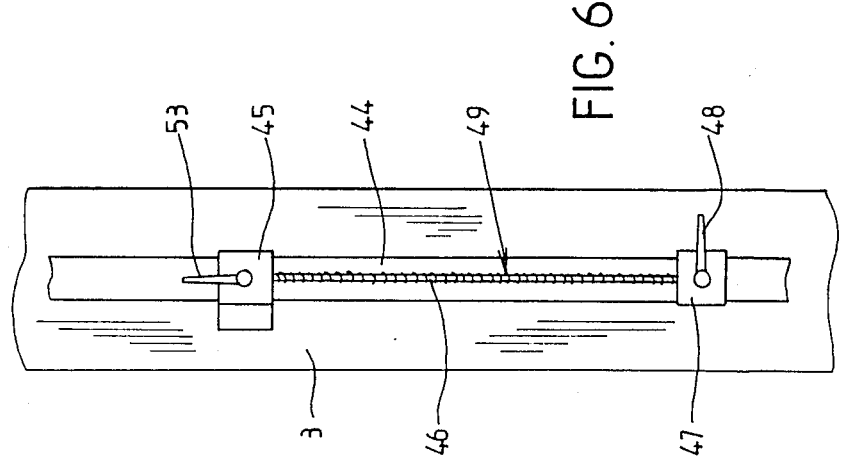
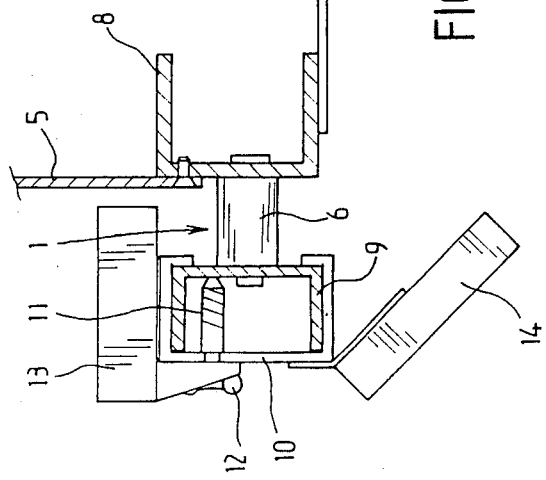
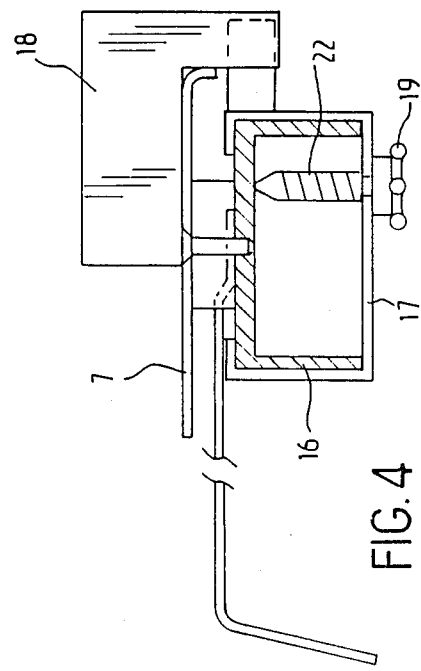

AUTOMATIC VERTICAL GLASS CUTTING MACHINE

BACKGROUND OF THE INVENTION

1. Field of the Invention

The present invention relates to a glass cutting machine and concerns more precisely an automatic vertical machine with pneumatic actuator.

Wall machines are already widely used for the industrial cutting of glass or plastics in the form of plates or strips disposed vertically on edge, a cutting wheel moving from top to bottom, guided in this movement by a vertical support. This solution is preferred to the conventional flat cutting systems, which have the drawback of requiring a large sized cutting table and which call for many precautions on the part of users in handling the plates to be cut without breaking them. So called wall or vertical machines avoid these drawbacks and can be readily placed in the corner of a workshop or shop. They include essentially a horizontal gutter serving as container for the glass plate, a vertical backrest running along this gutter on which the plate leans with a slight slant so as to prevent it from tipping forwards and a cutting-wheel carrying carriage sliding on a vertical ramp placed opposite a post serving as bearing point for the plate during the cutting operation. The carriage associated with a counterweight is operated by means of a handle by a user who manually cuts the glass prepositioned in the machine.

These manual machines obviously have capacities in use limited to the cutting rate which a user can achieve, because of the weight of the carriage and because of the force which must be exerted on the wrist at the time of cutting. There is also a limitation to the sizes of glass cut since a single person cannot move this carriage vertically to an inaccessible height. Finally, when the cutting line has been made, the glass is broken manually by the person who must, for that, create a shock on the piece to be cut and hold it.

SUMMARY OF THE INVENTION

The invention provides a machine which offers a certain number of advantages and improvements over existing systems, while overcoming in particular the above mentioned disadvantages.

The glass cutting machine of the invention, which includes a vertical support for receiving on edge the glass plate to be cut, a vertical ramp on which slides a cutting-wheel holder carriage and mobile stops placed on the horizontal support and associated with position reading devices, has mainly as objective a cutting-wheel holder carriage movable vertically from bottom to top and top to bottom over a predetermined height of the vertical ramp under the action of an actuator of the pneumatic actuator type, the cutting-wheel holder being secured to the carriage by means of a rocker arm movable with respect to the body of the carriage which includes a mechanism for locking said rocker, fixed means being provided on the machine for acting on elements movable with the carriage for locking the rocker and controlling the actuator.

According to a particular feature of the invention, the mechanism for locking the rocker against the carriage is provided by means of an engagement lever pivoting on a side of the carriage and engaging a stud on the rocker under the action of a return spring, the engagement lever extending slightly forward of the vertical plate. In addition, the rocker is supported at its base by a stirrup piece fast with the carriage by means of horizontal pivoting shafts and at its upper part a pressure spring is inserted between it and the carriage.

According to another particular feature of the invention, the fixed means provided on the machine is a cam placed at the base of the vertical beam, for acting on an element fast with the carriage formed by a roller, in the direction for locking the rocker and complementarily another fixed means provided on the machine is a fixed end of travel contactor for acting on a stop fixed to the carriage for controlling the actuator and glass breaking means.

According to another complementary feature of the invention, a bar is fixed to the front face of the vertical plate and over the whole of its height and a sliding stop with a locking lever limiting the travel of the carriage is locked on this bar at the desired predetermined height.

BRIEF DESCRIPTION OF THE DRAWINGS

The invention also includes other particular features and variants which will be clear from the following description illustrating a preferred embodiment of the invention, which must be considered as a non limitative example.

Reference is made to the accompanying drawings which show:

FIG. 6: a partial front view of the vertical plate with the sliding stop system.

DESCRIPTION OF THE PREFERRED EMBODIMENT

Figures 1, 2:
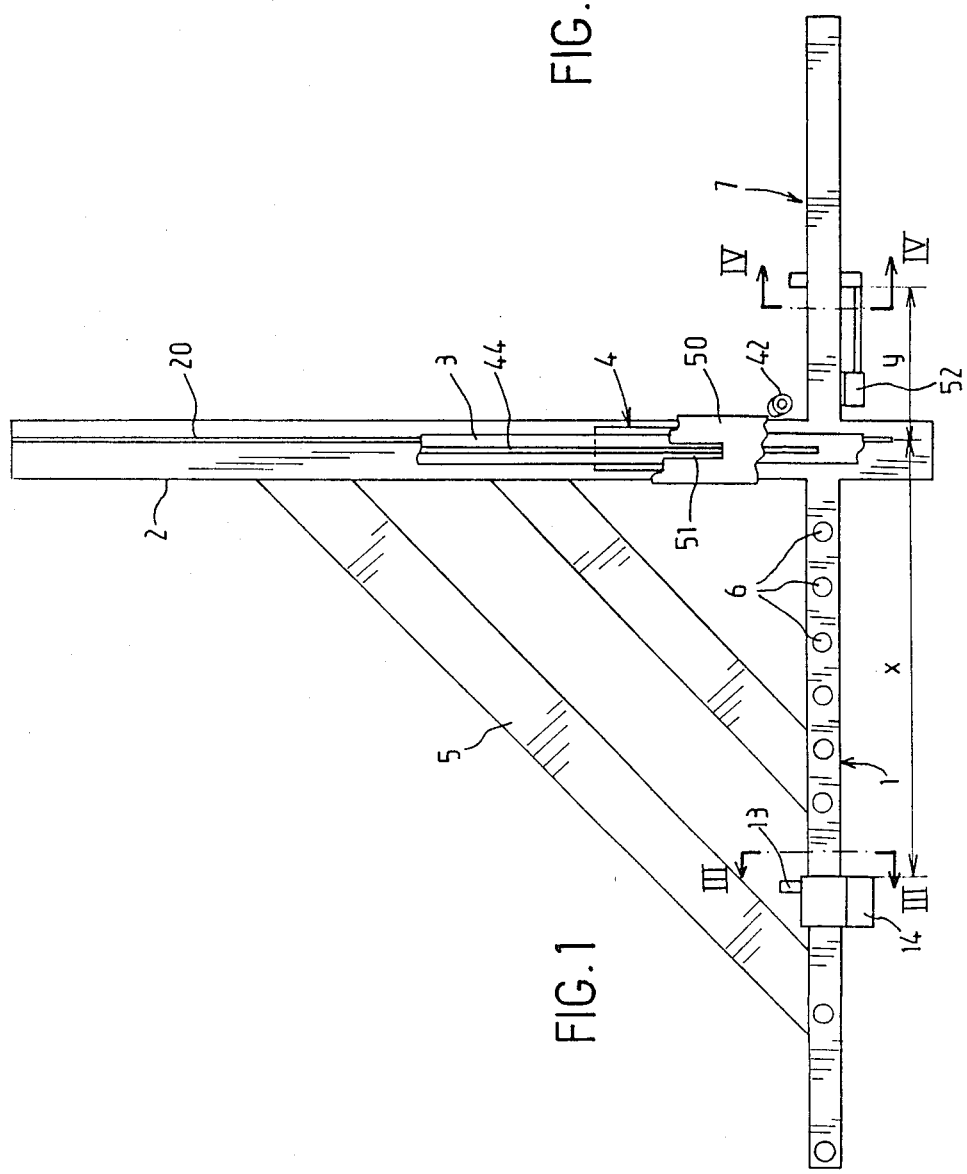
FIG. 1: a schematical front view of the machine.
FIG. 2: a schematical representation of the machine seen in elevation from the right in FIG. 1, FIG. 3: an enlarged view along III—III of FIG. 1, FIG. 4: an enlarged view along IV—IV of FIG. 1, FIG. 5: an enlarged side view of the cutting carriage.

The machine shown in FIGS. 1 and 2 includes essentially a horizontal gutter 1 serving for supporting a glass plate which rests on its edge, a vertical support beam 2 rising above the gutter, a vertical plate 3 parallel to the beam or post serving for guiding the cutting carriage 4 and including its lifting mechanism, a backrest 5 for supporting the glass plates and an apron 7 for supporting the glass portion to be cut. The bottom of gutter 1 is formed of a number of horizontally journalled rollers 6 for supporting the glass plate and facilitating its movement. As can be seen morely clearly in FIG. 3, rollers 6 are mounted between two U shaped brackets 8 and 9 whose bases form the side walls of gutter 1. On bracket 9, open towards the front, a slider 10 is mounted which can be locked against the bottom of the bracket by a screw 1 operated by a locking lever 12. Slider 10 supports a retractable stop 13 and a case 14 containing a tape measure, one end of which is fixed to the foot of beam 2. Between bracket 8 and the vertical beam 2 are fixed plates 5 which form the backrest for the glass plate to be cut and contribute to holding the vertical beam rigidly in position with respect to the gutter.

On the other side of beam 2, in the extension and at the level of roller 6, extends the apron 7 which serves as support for the piece of glass cut. Referring to FIG. 4, it can be seen that this apron is mounted on another bracket 16 in the form of an upturned U in which is mounted another slider 17 also supporting a stop 18 and having a locking lever 19 controlling a locking screw 22. To slider 17 is fixed the end of a tapemeasure housed in a case provided at the foot of beam 2, and whose zero corresponds to the cutting line of the mobile carriage 4.

Figure 5:
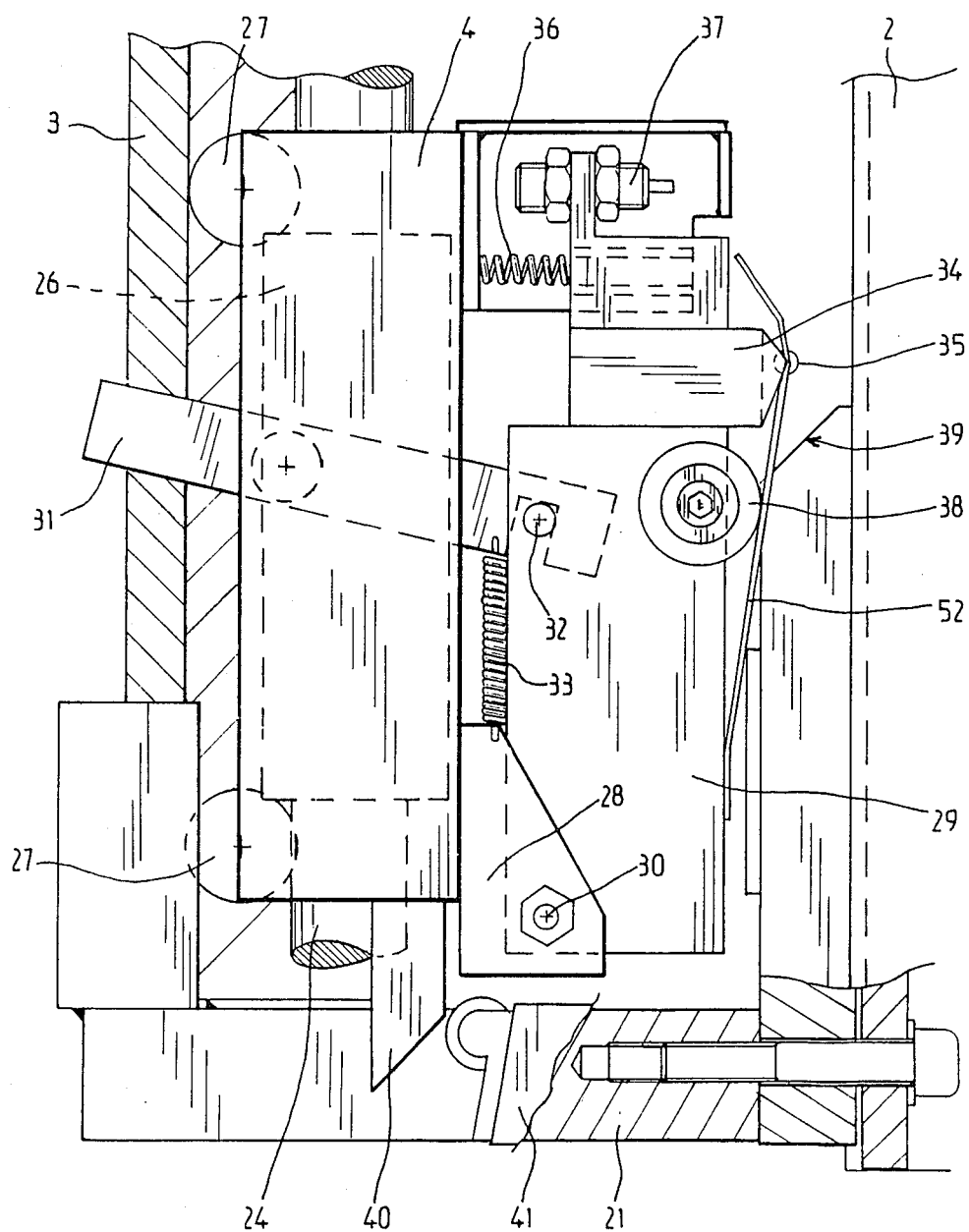

Gutter 1 and apron 7 which extends from it are fixed to the foot of the vertical beam 2 formed of an extruded section whose forwardly turned face has a groove 20 over the whole of its height. To this the base of its beam, below the plane of roller 6, is fixed a bracket 21 for supporting a vertical plate 3 which consequently rises in front of beam 2, and which is spaced apart therefrom over the whole of its height. Plate 3 is fixed to the top of the beam by another bracket 23. The vertical plate 3 has on its face turned towards the beam a guide tube 24 on which the cutting carriage 4 slides. This latter, shown in greater detail in FIG. 5 in the bottom position at the foot of the machine, is in the form of a parallelepipedic case which forms the mobile member of an actuator whose fixed part is the guide tube 24. Inside this hollow tube 24, having airpressure tubes 25 at each of its ends, moves a piston to which is magnetically slaved a slide 26 to which said carriage 4 is fixed. This latter has support wheels 27 applied on each side of the tube 24 against the wall of plate 3. To the base of carriage 4 is fixed a stirrup piece 28 for supporting a rocker arm 29. It will be noted that this rocker 29 moves rearwardly and along the body of carriage 4. It is supported at its base on stirrup piece 28 by means of horizontal pivoting shafts 30, and it is retained along the carriage by an engagement lever 31 pivoting on a side of the carriage and engageable with a stud 32 fixed to the rocker. In the position shown in FIG. 5, the engagement lever, returned by a return spring 33, holds the rocker 29 against the carriage. Lever 31, disposed on the side of the carriage 4, whose width is close to the width of the vertical plate 3, extends slightly forwards of this plate. On said rocker 29, at its upper part, is fixed a cutting wheel holder 34 whose cutting-wheel 35 is in line with the groove 20 formed in the vertical beam 2. A guide ramp 52, fixed to the rear of rocker 29, bears against the cutting-wheel holder 34 and has an aperture for passing the cutting-wheel 35. Furthermore, between the upper part of carriage 4 and the upper part of rocker 29, a pressure spring 36 is provided which is in a compressed position when the rocker is engaged by lever 31. A damping element 37, fixed to the rocker arm 29, damps its pivoting movement under the action of spring 36. The rocker arm 29 is also provided on one of its sides with a roller 38 intended to engage with a fixed cam 39 provided at the base of the vertical beam 2.

Finally, it will be noted that the cutting carriage 4 has, at its lower part, a stop 40 which in the low position actuates an end of travel contactor 41 mounted on bracket 21. A breakage actuator 42, whose operation is dependent on said contactor, is mounted sightly above the level of apron 7, in the vicinity of the well in which the carriage travels between beam 2 and plate 3, and is oriented so that its mobile breaking end piece 43 extends horizontally in the direction of the cut glass plate with a certain slant with respect to this plate.

Furthermore, referring more prcisely, to FIGS. 1, 2 and 6, on the front face of the vertical plate 3 and over the whole of its height is fixed a bar 44 on which a stop 45 slides, limiting the travel of carriage 4, which stop may be locked to the bar by an adjustment and locking lever 53. This stop 45 projects from the width of the bar and intersects the path of lever 31 fixed to carriage 4. In addition, it is connected by a rod 46 to a connecting slider 47 also having an adjustment and locking lever 48; rod 46 slides freely in stop 45 and a spring 49, coaxial with the rod and compressed between it and slider 47, tends to hold them in the maximum spaced apart position.

Finally, a cover 50 covers the vertical plate 3 and the carriage travel well, of course leaving a space between it and the vertical beam 2 for passing plates of glass. A vertical groove 51 is provided in this cover for passing the levers 48 and 53 therethrough.

The machine operates in the following way: at rest, the cutting carriage is in a top position, defined by the height of stop 45 on bar 44. When, at the end of the preceding cutting operation, carriage 4 has moved up, the front end of its pivoting lever 31 came into contact with the fixed stop 45 immobilized at a given height by means of lever 53. Lever 31 pivots consequently against the force of spring 33 which results in releasing stud 32. The rocker arm 29 now being free, rocks about shafts 30 under the effect of the force of spring 36, the purpose of the damping mechanism 37 being to slow down this rocking movement. Under the action of this spring, the cutting-wheel holder 34 is applied against the extruded section forming the vertical beam 2. Carriage 4 remains immobilized in this position by the engagement between stop 45 and lever 31. The cutting-wheel 35 is engaged in groove 20 of said vertical beam.

The locking height of the carriage is therefore defined by the height given to stop 45 which depends on the dimension of the glass plates to be cut. Should this height be too great to be accessible, the user has available the connecting slider 47 which allows him to move the stop and lock it at the desired height by means of its own locking lever 48 and rod 46. The rod, sliding freely in stop 46 against the force of spring 49, on the other hand makes it possible to place the stop of the carriage in a low position, allowing slider 47 and this stop to be brought closer together.

With the carriage thus immobilized in the high position, the user may move the glass plate resting on its edge on rollers 6 and leaning against the back rest 5. He makes sure that stop 13 is located on bracket 9 and locked by lever 12 at a distance x from groove 20 where cutting will take place, which distance is read on the tape measure 14. This distance x corresponds to a desired cutting width when it is desired to obtain a cut plate of larger size. The user may also cause the plate to be cut to slide until it abuts against stop 18, positioned and locked by lever 19 at a distance Y from groove 20, which distance is read from the tape measure 52. This distance Y corresponds to a desired cutting width when it is easier to measure from this side. However it may be, stops 13 and 18 serve for holding the plate to be cut in position so that the cut takes place at the desired distance.

With the glass in position, the user actuates a control pedal not shown, which controls the pneumatic actuator; an air pressure exerted in tube 24 by the upper pressure tube 25 causes the mobile carriage 4 to move down, which slides on this tube 24, its wheels 27 rolling on the plate 3. During the downward movement of the carriage, rocker 29 remains applied against the web of beam 2, via the guide ramp 52, under the action of spring 36. When the rocker reaches the edge of the glass plate, this ramp 52 slides over the edge and makes it possible for the cutting-wheel 35 to cut the glass uniformly. When carriage 4 arrives at the end of travel at the lower part of the beam, that is to say below the level of apron 7, the cutting line is then finished. The side wheel 38 then engages the fixed cam 39 and thus the rocker arm 29 is urged against the body of the carriage. Stud 32 may snap into lever 31. The carriage is then in the position shown in FIG. 5. As soon as this operation is finished, stop 40 reaches the end of travel contactor 41, the carriage is immobilized and the contactor causes the supply of fluid in the actuator tube to be stopped; at the same time, the contactor cause the breakage actuator 42 to come into play, whose end pieces 43 strikes the part of the glass plate situated above apron 7, and breaks it. As soon as the pedal is released, the pressure is established at the base of tube 24 and carriage 4 rises to a top position until it is immobilized at the level of stop 45 under the above stated conditions. It is then ready for a new cutting cycle.

This machine, very simple to operate, is therefore particularly suitable for cutting single, double, laminated glass..., but also for other products such as rigid plastic materials or similar and cardboard.

The invention is not limited to the embodiment described above cut encompasses all the variants particularly in the choice of the actuator controlling the cutting carriage which may be of a different type, as well as in the operating mode which may provide for the carriage being at rest in the low position and for action on the control pedal to cause it to move up then to move down for cutting.

What is claimed is:

1. An automatic vertical glass cutting machine comprising: a horizontal support intended to receive the glass plate to be cut on edge, a vertical post serving as the bearing point for the glass plate during the cutting operation, a vertical ramp, a cutting-wheel holder carriage slidably mounted on the ramp and placed facing the vertical post, mobile stops on the horizontal support, position reading devices interconnected with the mobile stops, pneumatic actuator means for moving the cutting-wheel holder carriage vertically on the ramp from bottom to top and top to bottom over a predetermined height of the vertical ramp, the cutting-wheel holder carriage including a body, a cutting-wheel holder and a rocker arm, the cutting wheel holder being secured to the body by means of the rocker arm which is movable with respect to the body of the carriage, a mechanism for locking said rocker arm, and fixed means on the machine for acting on elements movable with the carriage for locking the rocker arm and controlling the pneumatic actuator.

2. The automatic machine as claimed in claim 1, wherein said vertical ramp is a plate fixed to a beam forming the vertical post by means of brackets, the face of said plate oriented towards the beam carrying a guide tube for the carriage as well as the mobile mechanism for driving said carriage.

3. The automatic machine as claimed in claim 1, wherein said guide tube is hollow and contains a piston movable pneumatically in the tube, to which said carriage is magnetically secured.

4. The automatic machine as claimed in claim 1, wherein said mechanism for locking the rocker arm against the carriage is provided by means of an engagement lever pivoting on a side of the carriage and engaging a stud on the rocker arm under the action of a return spring.

5. The automatic machine as claimed in claim 4, wherein said engagement lever extends slightly forward of the vertical plate.

6. The automatic machine as claimed in claim 1, wherein said rocker arm is supported at its base by a stirrup piece fast with the carriage by means of horizontal pivoting shafts, a pressure spring being inserted between the upper part of the rocker arm and the carriage.

7. The automatic machine as claimed in claim 6, wherein a damper element is provided on the rocker arm.

8. The automatic machine as claimed in claim 1, wherein a guide ramp fixed to the rear of the rocker arm bears against the cutting wheel holder and has an aperture for passing the cutting wheel therethrough.

9. The automatic machine as claimed in claim 1, wherein a roller is carried by the rocker arm and the fixed means provided on the machine includes a cam placed at the base of the vertical post for acting on the roller.

10. The automatic machine as claimed in claim 1, wherein a glass breaking means is mounted on the vertical ramp, the fixed means provided on the machine including an end of travel contactor mounted on the vertical post, the end of travel contactor acting controlling the pneumatic actuator and the glass breaking means.

11. The automatic machine as claimed in claim 10, wherein said breaking means is an actuator mounted above the horizontal support and oriented so that its mobile breaking end piece extends horizontally and with a certain slant in the direction of the glass plate.

12. The automatic machine as claimed in claim 1, wherein a bar is fixed to the front face of the vertical ramp and over the whole of its height, and a sliding stop with a locking lever limiting the travel of the carriage is locked to the bar at the desired predetermined height.

13. The automatic machine as claimed in claim 12, wherein said stop is connected by a rod to a connecting slider also having an adjustment and locking lever.

14. The automatic machine as claimed in claim 13, wherein said rod slides freely in said stop, and wherein a spring is mounted coaxially about the rod, the spring being between said stop and said slide.

15. The automatic machine as claimed in claim 1, wherein the horizontal support includes rollers mounted between two bracket shaped supports and wherein a slider lockable on a bracket carries a stop and a case containing a tape measure, one end of which is fixed to the foot of the beam.

16. The automatic machine as claimed in claim 1, having a apron serving as horizontal support for the piece of glass to be cut and mounted on a bracket, and wherein a slider lockable on said bracket has a stop and the end of a tape measure located at the foot of the beam is attached to said slider.

* * * * *